(12) United States Patent
Haeusler et al.

(10) Patent No.: US 9,561,461 B2
(45) Date of Patent: Feb. 7, 2017

(54) FILTER ELEMENT

(71) Applicant: Mahle International GmbH, Stuttgart (DE)

(72) Inventors: Ingo Haeusler, Esslingen (DE); Stefan Kaiser, Remseck (DE); Ruediger Knauss, Kernen I.r. (DE); Gerhard Rudolph, Stuttgart (DE); Hans Waibel, Remseck Aldingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/116,784

(22) PCT Filed: Jan. 23, 2015

(86) PCT No.: PCT/EP2015/051306
§ 371 (c)(1),
(2) Date: Aug. 4, 2016

(87) PCT Pub. No.: WO2015/117837
PCT Pub. Date: Aug. 13, 2015

(65) Prior Publication Data
US 2016/0346722 A1  Dec. 1, 2016

(30) Foreign Application Priority Data

Feb. 5, 2014  (DE) .................. 10 2014 202 094

(51) Int. Cl.
*B01D 46/52* (2006.01)
*B01D 46/00* (2006.01)

(52) U.S. Cl.
CPC ......... *B01D 46/521* (2013.01); *B01D 46/0001* (2013.01); *B01D 46/0002* (2013.01);
(Continued)

(58) Field of Classification Search
CPC ............ B01D 46/0001; B01D 46/0002; B01D 46/0005; B01D 46/103; B01D 46/521; B01D 2265/04; B01D 2275/206
See application file for complete search history.

(56) References Cited

U.S. PATENT DOCUMENTS

| 8,940,071 B2 | 1/2015 | Enderich et al. |
| 2010/0154369 A1* | 6/2010 | Berisha ............... B01D 46/103 55/493 |

FOREIGN PATENT DOCUMENTS

| DE | 10106734 A1 | 9/2002 |
| DE | 202008013309 U1 | 3/2009 |

(Continued)

OTHER PUBLICATIONS

English abstract for DE-10106734.
English abstract for DE-102011083657.
English abstract for DE-102012012349.

*Primary Examiner* — Robert Clemente
(74) *Attorney, Agent, or Firm* — Fishman Stewart PLLC (57) ABSTRACT

A filter element for at least one of a fresh air system and a ventilation and/or air-conditioning system of a motor vehicle may include a filter body including a folded filter material that laterally surrounds an internal space. A first end plate and a second end plate may be sealingly attached to the filter body at sides that are facing away from one another. A front plate may be arranged in a lateral region of the filter body. The front plate may include a first end plate joining region and a second end plate joining region facing the first end plate and the second end plate. The first and second end plate joining regions may be fused with a front-side end of the first and second end plates.

20 Claims, 6 Drawing Sheets

(52) U.S. Cl.
CPC ...... *B01D 46/0005* (2013.01); *B01D 2265/04* (2013.01); *B01D 2275/206* (2013.01)

(56) References Cited

FOREIGN PATENT DOCUMENTS

| | | |
|---|---|---|
| DE | 102010023393 A1 | 12/2011 |
| DE | 102011083657 A1 | 3/2013 |
| DE | 102012012349 A1 | 12/2013 |
| WO | WO-2008/141945 A1 | 11/2008 |

\* cited by examiner

FILTER ELEMENT

CROSS-REFERENCE TO RELATED APPLICATIONS

This application claims priority to German Patent Application No. 10 2014 202 094.8, filed Feb. 5, 2014, and International Patent Application No. PCT/EP2015/051306, filed Jan. 23, 2015, both of which are hereby incorporated by reference in their entirety.

TECHNICAL FIELD

The present invention relates to a filter element, in particular an air filter element for a fresh air system of an internal combustion engine or for a ventilation- and/or air-conditioning device of a motor vehicle. The invention furthermore relates to a method for producing such a filter element.

BACKGROUND

Such an air filter element is known from WO 2008/141945 A1. It comprises a filter body made of a folded filter material that laterally surrounds an internal space of the filter element except in a lateral region. A first end plate and a second end plate are sealingly attached to the filter body at sides that a facing away from one another. In addition, a front plate is provided, which is arranged in the lateral region and which has a connecting piece for supplying or conducting away air. In the known filter element, the front plate is glued onto the end plates and/or is clipped therewith. Furthermore, the front plate is glued or foamed onto the filter body. In an alternative embodiment, on the other hand, provision can be made to configure the front plate integrally with at least one of the end plates.

The lateral region forms an open side of the filter body, which must be sufficiently tightly closed by means of the front plate in order to prevent erroneous flows. Here, the connection must also ensure a reliable seal in the case of permanently occurring, higher mechanical and/or thermal stresses, which can occur owing to vibrations and shocks, or respectively owing to the radiant heat of the internal combustion engine.

SUMMARY

The present invention is concerned with the problem of indicating for such a filter element, in particular an air filter element, an improved embodiment which is distinguished in particular by a high degree of reliability of the tight connection of the front plate to the end plates and to the filter body, wherein at the same time a simple and inexpensive producibilty is aimed for.

This problem is solved according to the invention by the subjects of the independent claims. Advantageous embodiments are the subject of the dependent claims.

The invention is based on the general idea of producing the front plate as a separate component with respect to the two end plates and to connect the front plate in a secure and sufficiently tight manner both with the end plates and also with the filter body by means of a thermal method. For this, the front plate is fused in two end plate joining regions, assigned to the respective end plate, with front-side ends of the two end plates, therefore connected in a materially bonded manner. Furthermore, the front plate is connected in two end fold joining regions with two end folds of the filter body by means of plasticizing. For this, the end fold joining regions of the front plate are heated and in particular are fused until a sufficient plasticizing occurs. Subsequently, the filter body can be pressed by its respective end against the respective end fold joining region, whereby the filter material can dip into the plasticized plastic of the front plate. Hereby, at the respective end of the filter body at least the respective end fold is plasticized into the front plate.

The two ends of the filter body laterally delimit the lateral region. The front-side ends of the two end plates delimit the lateral region transversely to the ends of the filter body, whereby the lateral region is completely surrounded by the two ends of the filter body and the two front-side ends of the two end plates in a circumferential direction. The surround, which is thus formed, of the lateral region is sealed via the joining regions of the front plate with respect front plate, whereby the risk of erroneous flows is reduced. Therefore, leakage flows are reliably prevented.

In a particular embodiment of the filter element according to the invention an opening is provided in the lateral region for a connection of the filter internal space to a connecting piece. Therefore, the lateral region is embodied as a connecting region.

According to an alternative configuration, the lateral region is embodied so as to be closed, and the connection of the filter internal space to the connecting piece is arranged in one of the end plates. In further configurations, both the lateral region and also one of the end plates can have a connection. Here, one of the connections can be dimensioned considerably smaller than the other, and can be used e.g. as secondary air connection.

For the fusing of the respective end plate joining region with the associated front-side end of the respective end plate, the end plate joining regions and the front-side ends are heated and in particular are fused until a sufficient plasticizing is achieved, which with a pressing of the front plate onto the end plates enables the desired materially bonded fusion- or melt connection between the front plate and the end plates.

The thermal connection methods proposed here can be carried out with high process safety, so that the desired connections are able to be realized with a high degree of reliability and sufficient tightness in a simple manner also within mass production.

According to the invention, the respective end plate joining region is formed on an edge region of the front plate and has a connecting web projecting axially from the edge region with respect to a longitudinal centre axis of the connecting piece, which connecting web is fused axially with the front-side end of the respective end plate with respect to the longitudinal centre axis of the connecting piece. The respective connecting web thereby defines the region of the front plate which is to be fused, namely the free-standing end of the connecting web. Hereby, only a comparatively small volume of plastic is to be fused, whereby the energy required for this is reduced. Furthermore, an axial pressing of the front plate onto the two end plates is comparatively simple to realize.

The respective end plate can have at its front-side end respectively a collar angled transversely to the longitudinal centre axis of the connecting piece, which collar is fused with the connecting web. Through the provision of such a collar, comparatively great manufacturing tolerances can also be dealt with in a simple manner. In addition, a tool can rest on a side of the respective collar facing away from the front plate, in order to simplify the pressing of the front plate onto the two end plates.

In another embodiment, the respective end fold joining region can be fused radially with the respective end plate in an edge region, facing the respective end plate, with respect to a longitudinal centre axis of the connecting piece. Hereby, a tight connection of the respective end fold joining region to the end plates is realized, so that the tight connection of the front plate to the end plates and to the filter body on the front plate takes place uninterruptedly in the circumferential direction.

In an advantageous further development, provision can be made that the edge regions of the end fold joining regions are spaced in radial and/or axial direction from the respective connecting web of the respective end plate joining region. Hereby, a collision of the axial and radial fuse connection zones can be prevented.

In another embodiment, the two end fold joining regions can project axially over the two end plate joining regions, proceeding from the front plate with respect to a longitudinal centre axis of the connecting piece. Hereby, the end fold joining regions can dip relatively far into the filter body, therefore between the end plates, for the plasticizing-in of the ends of the filter body. At the same time, it is thereby also achieved that the axially acting fuse connection sites and the radially acting fuse connection sites, which are present if applicable, are spaced axially from one another.

The folds of the folded filter material of the filter body run expediently parallel to one another. Transversely to the longitudinal direction of the fold, the filter body has two end sides, which are covered by the two end plates. Expediently, the filter body is plasticized at these end sides into the end plates. Therefore, a sufficient seal is also realized reliably in this region.

The two end plates are spaced from one another and in this respect are separate components. According to a particular configuration, the two end places are de-signed as closed end plates, so that they completely close the respective end side of the filter body. In an alternative configuration, at least one of the end plates has an opening which is configured as an inlet or outlet for the fluid which is to be cleaned or respectively for the cleaned fluid. In such a configuration, the front plate can then be embodied so as to be closed, therefore without an inlet or respectively outlet. Therefore, the filter element can be adapted in a suitable manner to the installation space which is available. In another embodiment, both an end plate and also the front plate can have an opening. Therefore, either the cleaned volume flow can be divided into two flow paths (e.g. primary air and secondary air), or the volume flow, which is to be cleaned, of two flow paths can be brought tougher. According to a preferred embodiment, the two end plates are also not supported against each other in the internal space. Therefore, with sufficient rigidity of the end plates, no geometries disturbing the flow are present. In the case of end plates with low rigidity, however, supports of the end plates against one another arranged in the inner space can also be provided to achieve the necessary rigidity.

In another advantageous embodiment, the two end plates can have a distance from one another in the region of the filter body, which is smaller than an opening width of the connecting piece measured parallel to the distance. Hereby, a comparatively large opening cross-section can be realized for the connecting piece, which enables correspondingly great volume flows through the filter element.

At least one of the end plates can have a convexity in an end region, facing the front plate, which convexity projects from the internal space outwards from the remaining end plate. Hereby, it is possible in a particularly simple manner to enlarge the distance between the two end plates in the connection region, whereby it is possible in particular to use a connection opening with a large opening cross-section according to the manner described above.

Usually, the individual folds within the filter body are of equal width, so that the filter body generally has a constant height from its first end up to its second end. Accordingly, the associated end plate also has a substantially flat filter body connection region. Expediently, the front-side end of the end plate, facing the front plate, provided with the convexity, can now have between the ends of the flat filter body connection region an outwardly curved region with respect to the internal space. The associated end plate joining region of the front plate can now be shaped in a complementary manner thereto.

Expediently, provision can be made that only one of the two end plates is equipped with such a convexity, whilst the other end plate is then configured in a substantially flat manner. Alternatively, it is basically likewise possible to equip both end plates with such a, or respectively with different, convexities.

In other configurations, the fold width and/or fold height can vary. Therefore, an uneven filter body structure is produced, which is closed off by a likewise uneven end plate. Therefore, the filter insert can be adapted to installation spaces of any desired configuration.

The opening cross-section of the connecting piece can be circular. Preferably, however, it is oval, wherein the greater diameter runs transversely to the spacing direction of the two end plates.

The respective end plate has an outer region which is connected with the filter body. This outer region has on the side facing the filter body the previously mentioned filter body connection region. The outer region extends here from the one side of the front plate to the other side of the front plate. Here, the outer region forms with the associated front-side end a lateral surround of an inner region of the respective end plate. This inner region can be ribbed for the intensive reinforcing of the respective end plate. Here, a longitudinal ribbing or a transverse ribbing or a cross-ribbing with transverse and longitudinal ribs is conceivable.

In another embodiment, the respective end fold can have a perforation, which is penetrated by the plastic of the respective end fold joining region. Through this provision, on pressing of the plasticized end fold joining region, the plastic of the front plate can penetrate the respective end fold in the perforation. Subsequently, the end fold is embedded into the plastic of the end fold joining region. Hereby, a particularly inventive anchoring of the filter material in the plastic of the front plate is produced.

A method according to the invention for producing such an air filter element makes provision that firstly the two end plates are fastened to the filter body. This can take place by means of plasticizing. Basically, however, other fastening methods are also conceivable here. Subsequently, however before the mounting of the front plate, the front-side ends of the end plates and the end plate joining regions of the front plate and the end fold joining regions of the front plate are heated in the connection region and are thereby plasticized, therefore are transferred into a plastic state and in particular are fused. Subsequently, the front plate can now be placed in the connection region against the ends of the end plates and against the ends of the filter body, such that the ends of the end plates fuse with the end plate joining regions and the end folds of the filter body plasticize into the end fold joining regions. Expediently, the placing of the front plate takes place with a predetermined pressing path, in order to assist the fusing or respectively the plasticizing-in. Alternatively, the placing can also be controlled by a predetermined contact pressure.

According to an advantageous embodiment, the respective end fold joining region of the end sheet or respectively end plate before the fusing can have a three-dimensional fusing contour. Such a fusing contour can be realized for example by grooves or lobes or by an embossing, and therefore differs from a smooth, flat structure. Such a three-dimensional fusing contour creates an enlarged surface, whereby a uniformly deep and homogeneous fusing of the end fold joining region can be achieved.

A grooving or lobing of the filter medium increases the connection surface and therefore contributes to an improved connection.

In another advantageous embodiment, the respective end fold can have a perforation, which is penetrated by the plastic of the respective end fold joining region on placement of the front plate. Hereby, a particularly intensive connection between front plate and filter material is achieved.

Further important features and advantages of the invention will emerge from the subclaims, from the drawings and from the associated figure description, with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

According to FIGS. 1 to 11, an air filter element 1, which can come into use in an internal combustion engine in a fresh air system or in a vehicle in a ventilation- and/or air-conditioning system, comprises a filter body 2, a first end plate 3, a second end plate 4 and a front plate 5. The filter body 2 consists of a folded filter material 6 and surrounds an internal space 7 of the filter element 1 except in a lateral region 8, which in the example of FIGS. 1 to 9 is configured as a connection region, which can also be designated below by the reference number 8. In the example shown here, the filter body 2 is configured so as to be substantially U-shaped. The filter body 2 has two ends, namely a first end 9 and a second end 10, in which the filter material 6 respectively has an end fold, namely a first end fold 11 in the first end 9 and a second end fold 12 in the second end 10. The ends 9, 10 laterally delimit the connection region 8. The two end plates 3, 4 are fastened to the filter body 2 in a sealed manner on sides or end sides of the filter body 2 facing away from one another. Preferably, the filter body 2 is plasticized here at its end sides into the two end plates 3, 4.

The front plate 5 is arranged in the connection region 8 and in the embodiment shown in FIGS. 1 to 9 has a connecting piece 13, which is formed integrally on the front plate 5. Through the connecting piece 13, according to the through-flow direction of the filter body 2, air can be supplied to the internal space 7 or conducted away from the internal space 7.

The front plate 5 has a first end plate joining region 14, assigned to the first end plate 3, which end plate joining region is fused with a front-side end 15 of the first end plate 3 facing the front plate 5. The front plate 5 has, in addition, a second end plate joining region 16 assigned to the second end plate 4, which end plate joining region is fused with a front-side end 17 of the second end plate 4 facing the front plate 5. Via the two end plate joining regions 14, 16, the front plate 5 is therefore connected securely and in a sealed manner with the two end plates 3, 4.

Figure 2:
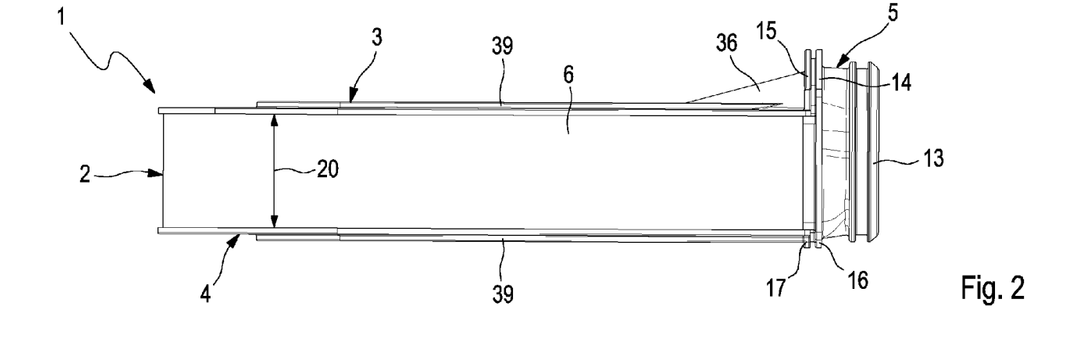
FIG. 2 a side view of the air filter element, corresponding to a viewing direction II in FIG. 1, FIG. 3 a front view of the air filter element, corresponding to a viewing direction III in FIG. 1, FIG. 4 longitudinal section of the air filter element according to section lines IV in FIG. 3, FIG. 5 an enlarged detail V of FIG. 4, FIG. 6 a sectional view of the air filter element in the region of a front plate according to section lines VI in FIG. 1, FIG. 7 an enlarged detail VII of FIG. 6, FIG. 8 a sectional view of the air filter element in the region of the front plate according to section lines VIII in FIG. 1, FIG. 9 an enlarged detail IX of FIG. 8, FIG. 10 an isometric view of the air filter element, but in another embodiment, not according to the invention, FIG. 11 a sectional view of the air filter element of FIG. 10 according to section lines XI.
Figure 3:
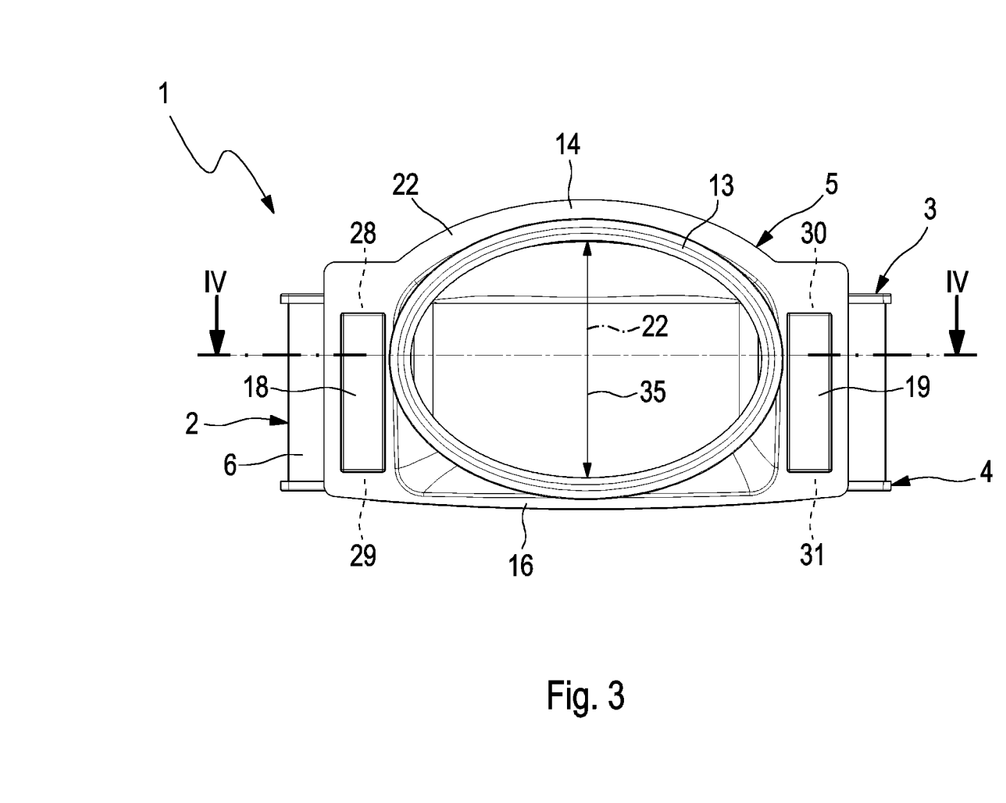
Figure 4:
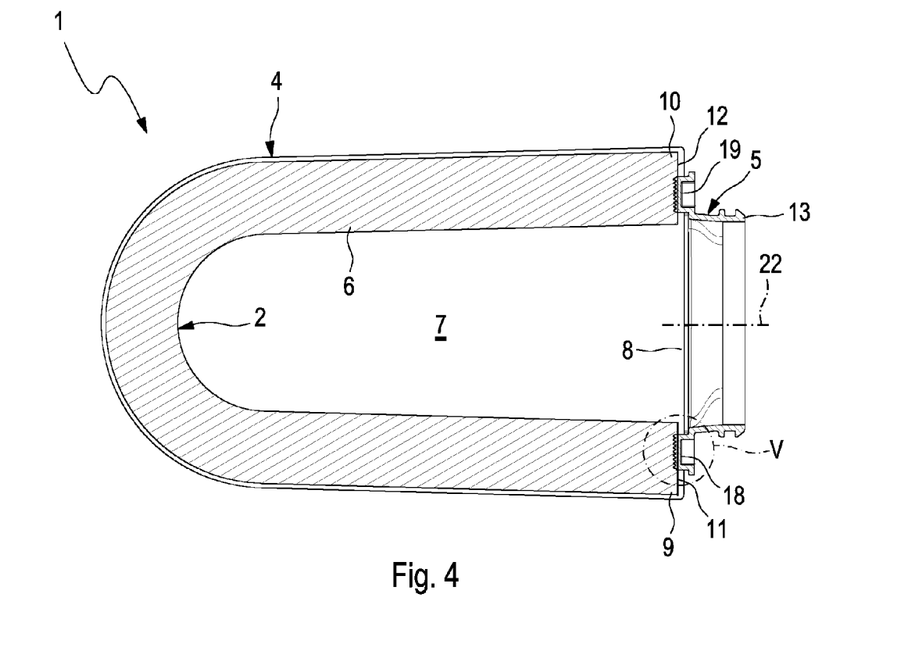
Figure 5:
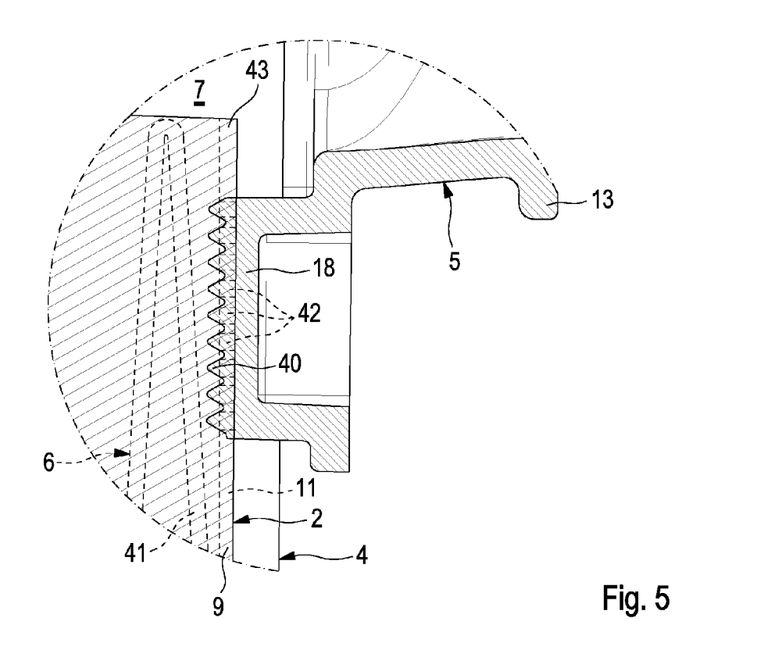

Furthermore, the front plate 5 has a first end fold joining region 18, which is as-signed to the first end 9 of the filter body 2 and into which at least the first end fold 11 is plasticized. The front plate 5 has in addition a second end fold joining region 19, which is assigned to the second end 10 of the filter body 2 and into which at least the second end fold 12 is plasticized. Via the two end fold joining regions 18, 19, the front plate 5 is therefore connected securely and in a sealed manner with the filter body 2. For this, the respective end fold joining region 18, 19 extends expediently over the entire height of the filter body 2, which is defined by the distance of the two end plates 3, 4 and is indicated in FIG. 2 by a double arrow designed by 20. According to the folding of the respective end fold 11, 12, in addition a penultimate fold 41, immediately adjoining the respective end fold 11, 12, can be at least partially also plasticized into the front plate 5. In FIG. 5, the last fold or respectively end fold 11 and the penultimate fold 41 are indicated by a broken line within the filter body 2, which is otherwise illustrated in a simplified manner as a solid block.

Figure 6:
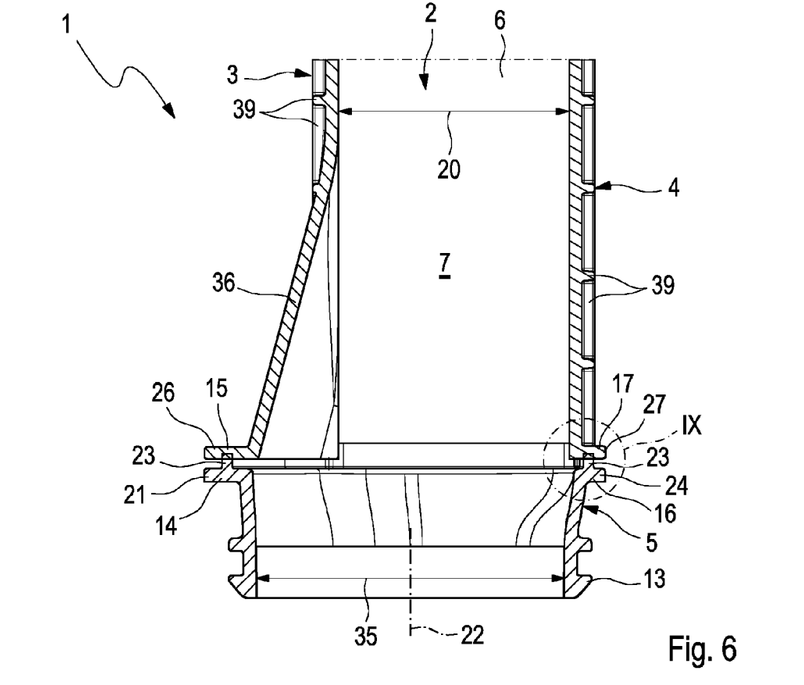
Figure 7:
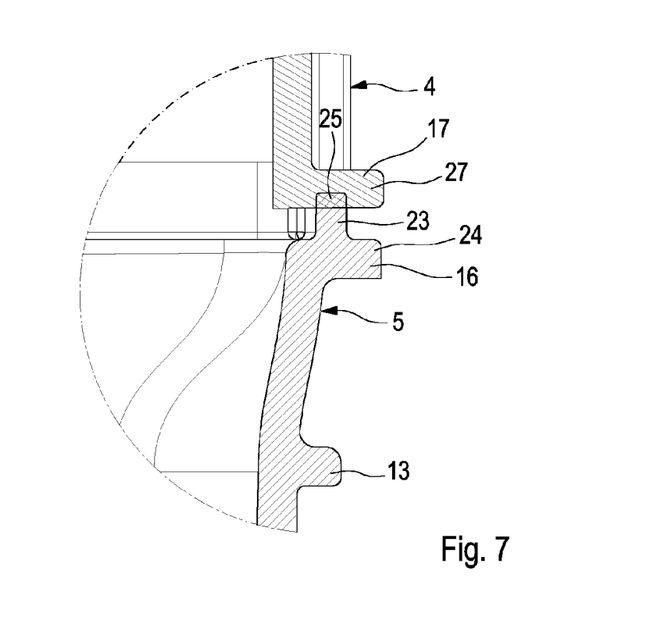
Figure 8:
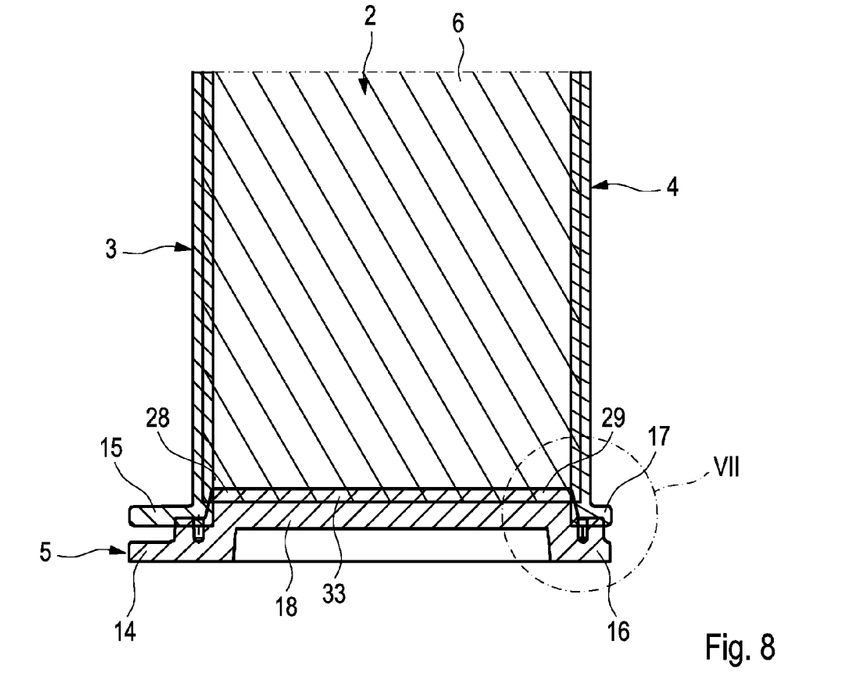

As can be seen in particular from FIGS. 6 and 7, the first end plate joining region 14 can be formed on a first edge region 21 of the front plate 5 and can have a connecting web 23 protruding axially from the first edge region 21 with respect to a longitudinal centre axis 22 of the connecting piece 13. This connecting web 23 is axially fused with the front-side end 15 of the first end plate 3. The same also applies to the second end plate joining region 16, which is illustrated on an enlarged scale in FIG. 7. As can be seen the second end plate joining region 16 is also formed on a second edge region 24 of the front plate 5 and is likewise equipped with an axially projecting connecting web 23, which is axially fused with the corresponding front-side end 17 of the second end plate 4. The connecting web 23 forms a closed contour with the end fold joining regions 18, 19. In FIG. 7 a fuse connection zone 25 is indicated here, in which the connecting web 23 dips, as it were, into the material of the second end plate 4, with the fusing or respectively the materially bonded connection therefore taking place.

The respective end plate 3, 4 has at the associated front-side end 15, 17 respectively a collar 26 or respectively 27, angled transversely to the longitudinal centre axis 22 of the connecting piece 13, whereby a type of flange is created, which can also be contacted axially by the respective web 23 in the case of greater manufacturing tolerances.

According to FIGS. 3 to 9, the first end fold joining region 18 is radially fused with the first end plate 3 in a first edge region 28, facing the first end plate 3, with respect to the longitudinal centre axis 22 of the connecting piece 13. In addition, the first end plate joining region 18 is likewise fused radially with the second end plate 4 in a second edge region 29 facing the second end plate 4. The same applies here also for the second end fold joining region 19, which has a first edge region 30, facing the first end plate 3, by which it is fused radially with the first end plate, and has a second edge region 31, facing the second end plate 4, by which it is fused radially with the second end plate 4. Therefore, the two end fold joining regions 18, 19 are not only connected securely and in a sealed manner with the filter body 2 by plasticizing, but also via the edge regions 28, 29, 39, 31 with the end plates 3, 4. Therefore, on the front plate 5 a contacting, circumferential in a closed manner in the circumferential direction with respect to the longitudinal centre axis 22, to the end plates 3, 4 and to the filter body 2 can be created.

Figure 9:
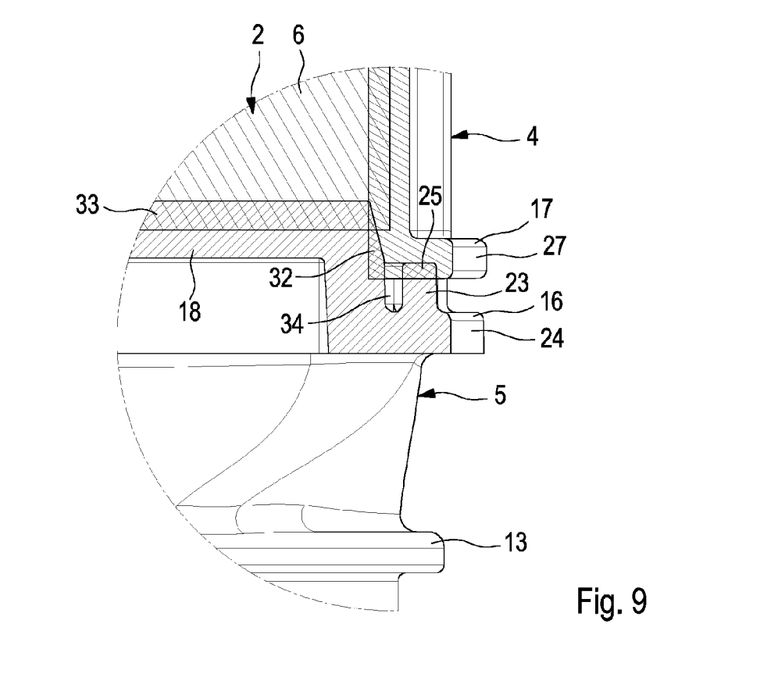

In the enlarged detail view of FIG. 9, the second edge region 29 of the first end fold joining region 18 is illustrated as being representative for all four edge regions. A fuse connection zone 32 is also indicated here, in which the front plate 5 dips, as it were, radially into the material of the second end plate 4. In this illustration, it can be clearly seen that the edge region 29 is spaced apart in radial and axial direction from the connecting web 23. In addition, a penetration region 33 or embedding region 33 can also be seen in FIGS. 8 and 9, in which the respective end fold 11, 12 (here the first end fold 11) is embedded in the plastic of the front plate 5 within the respective end fold joining region 18, 19 (here of the first end fold joining region 18). In order to improve this embedding or respectively in order to improve the penetration of the plastic of the respective end fold joining region 18, 19 with the filter material 6 of the filter body 2, provision can be made that at least the respective end fold 11, 12 is provided with a perforation 42, which is then penetrated by the plastic of the front plate 5 on mounting of the front plate 5. In FIG. 5, such a perforation 42 is indicated within the end fold 11. The perforation 42 can consist, for example, of several holes through which the fused or respectively plasticized plastic of the end fold joining region 18 can pass in a simple manner. In particular, thereby a plasticizing of the end fold joining region 18 can be improved in addition with the penultimate fold 41.

In addition, in FIG. 5 a preferred variant is shown with regard to the orientation of the respective end fold 11, in which an end edge 43 of the respective end fold 11 faces the internal space 7. Hereby, the risk of damage to the filter material 6 on mounting the filter element 1 is reduced. Alternatively, the end fold 11 could also be oriented so that its end edge 43 faces away from the internal space 7. The same then also applies to the other end fold 12, not illustrated in FIG. 5. As can likewise be seen from FIG. 5, the respective end fold joining region 18, 19 can project axially over the first end fold joining region 18 or respectively over the second end fold joining region 19, proceeding from the front plate 5 with respect to the longitudinal centre axis 22 of the connecting piece 13.

Furthermore, it can be seen from FIG. 9 that between the connecting web 23 and the respective first or second edge region 28, 29, 30, 31 (here the second edge region 29 of the first end fold joining region 18) a gap 34 can be formed, in order to prevent undesired interactions between the individual fuse connection zones 25, 32.

In the example shown, the two end plates 3, 4 are configured respectively as closed end plates 3, 4, whereby they completely cover the respective end side of the filter body 2. In addition, the two end plates 3, 4 are spaced apart from one another in the region of the filter body 2, whereby they have the distance 20 drawn in FIG. 2. As can be seen in particular from FIGS. 3 and 6, this distance 20 is smaller than an opening width 35 of the connecting piece 13 measured parallel to the distance 20. For this purpose, the first end plate 3 is equipped here in an end region, facing the front plate 5, with a convexity 36, which projects from the internal space 7 outwards from the remaining first end plate 3. The associated front-side end 15 of the first end plate 3 receives thereby an outwardly curved region, which is not designated in further detail here. The first end fold joining region 14 is shaped in a complementary manner thereto, which can be seen in FIG. 3. In addition, it is noteworthy that the connecting piece 13 has an oval opening cross-section, which can be seen in FIG. 3. Its smallest opening width 35 extends here parallel to the distance 20 of the two end plates 3, 4.

Figure 1:
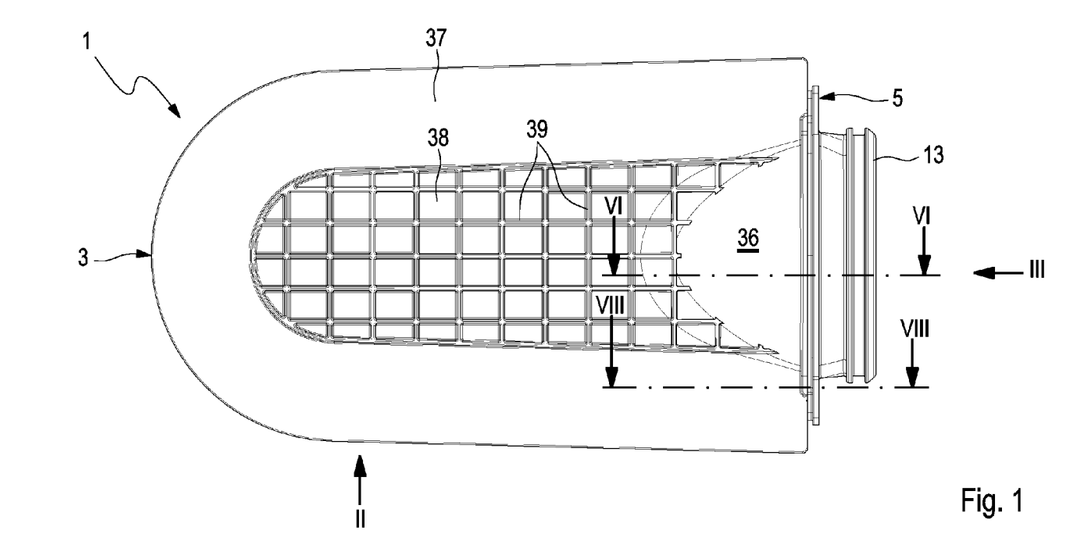
FIG. 1 a top view onto an air filter element.

In particular FIG. 1 shows that the respective end plate 3, 4 has respectively an outer region 37, which follows the course of the filter body 2 and which is securely connected with the respective end side of the filter body 2. On the side facing the filter body 2, this outer region 37 therefore has a filter body connection region, not designated in further detail, into which the filter material 6 can be plasticized. The outer region 37 extends, in the case of the two end plates 3, 4, respectively proceeding from the front plate 5 around the internal space 7 back to the front plate 5. In this respect, the outer region 37 surrounds, in the case of each end plate 3, 4, an inner region 38. In the example shown here, the inner region 38, in the case of the two end plates 3, 4, is provided with a ribbing 39, which is only applied outwards here, therefore only has ribs facing away outwards from the internal space 7. A rectangular cross-ribbing is provided here.

In the production of the filter element 1, firstly the two end plates 3, 4 are fastened to the filter body 2. For this, the two end plates 3, 4 can be heated in the respective filter body fastening region, until the plastic is sufficiently plasticized, in order to subsequently be able to plasticize the filter material 6 therein. Before the placement of the front plate 6, a heating now takes place of the front-side ends 15, 17 of the two end plates 3, 4, of the two end plate joining regions 14, 16 and of the two end fold joining regions 18, 19, respectively until a sufficient plasticizing or respectively liquefaction is achieved. Subsequently, the front plate 5 is placed, preferably pressed, in the connection region 8 against the ends 15, 17 of the end plates 3, 4 and against the ends 9, 10 of the filter body 2. In so doing, the front-side ends 15, 17 of the two end plates 3, 4 fuse with the two end fold joining regions 14, 16. At the same time, the end folds 11, 12 are plasticized into the end fold joining regions 18, 19.

The pressing on of the front plate 5 can take place in a tool which supports the outwardly projecting collar 26, 27 of the front-side ends 15, 17 on a side facing away from the front plate 5 and which supports the two end folds 11, 12 and, if applicable—depending on the folding of the respective end fold 11, 12—also the penultimate fold adjoining thereto on the side facing away from the front plate 5. The regions 18, 19 of the front plate are also supported.

According to FIG. 5, the respective end fold joining region 18 or respectively 19 can have a three-dimensional fusing contour 40 at least before the fusing, which contour is indicated here by tooth-shaped elevations. This fusing structure 40 can more or less disappear on fusing and on pressing of the front plate 5 against the filter body or respectively on plasticizing of the respective end fold 11 into the respective end fold joining region 18. The fusing structure 40 can be produced by grooves or lobes and in particular in the injection mould.

Figure 10:
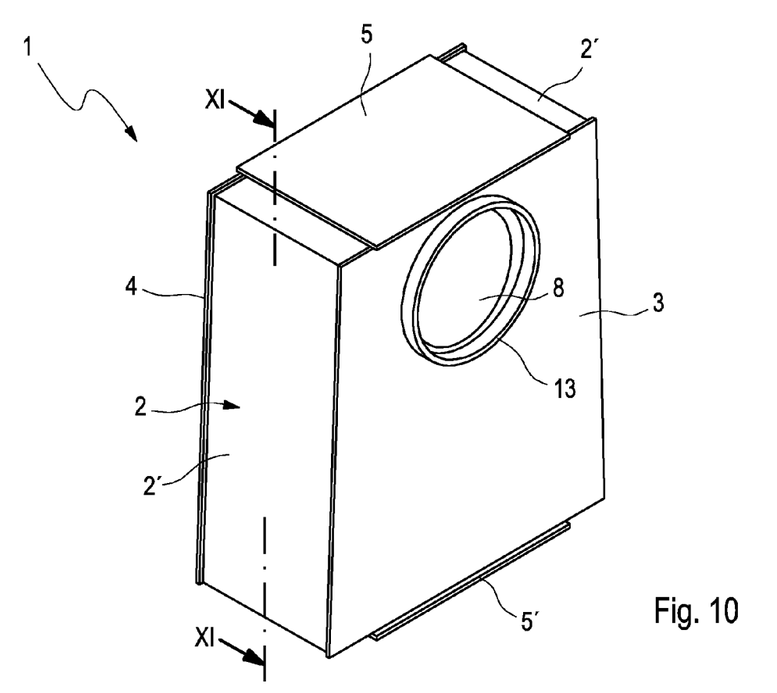
Figure 11:
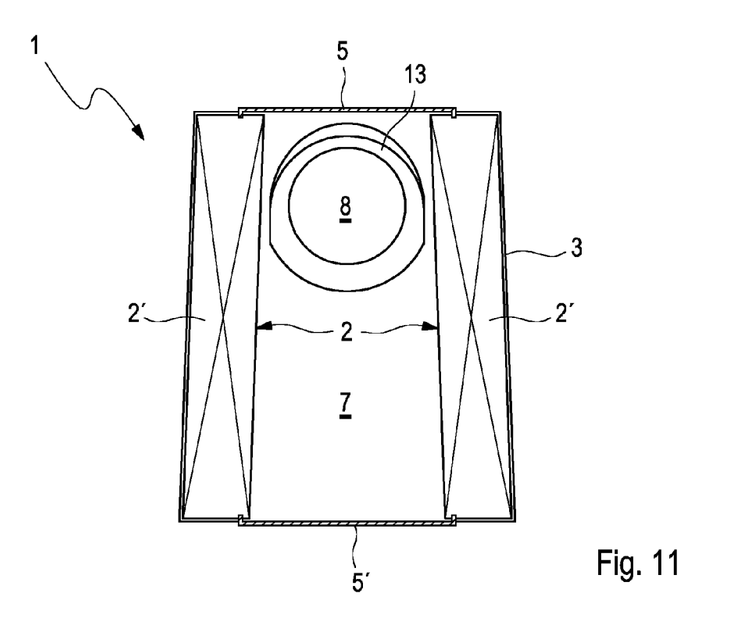

In FIGS. 10 and 11 another filter element 1, not according to the invention, is illustrated. Identical components are provided with the same reference numbers. In contrast to the embodiment shown in FIGS. 1 to 9, the filter element 1 has a closed front plate 5' and a first end plate 3 with a connecting piece 13. Furthermore, in this example the filter body 2 is not U-shaped, but rather is formed by two filter body segments 2' separated from one another. Through the separation of the filter body 2 into at least two filter body segments 2', an additional front plate 5 is provided, which in an analogous manner to the first front plate 5 is connected with the filter body 2 and with the end plates 3, 4. The features described above can be transferred to this example embodiment in an equivalent manner.

In other configurations, the division of the filter body 2 into filter body segments 2' can also be combined with a front plate 5 with connection. Furthermore, it is also possible to combine a one-piece filter body 2 with an end plate 3 with connecting piece 13. Also, two connecting pieces 13 can be provided, which are both arranged on the same front plate 5, 5' or on the same end plate 3, 4, or which are arranged respectively on one of the front sides 5, 5' or respectively on one of the end plates 3, 4, or of which the one front plate 5 or 5' and the other are arranged on the end plate 3 or 4.

The invention claimed is:

1. A filter element for at least one of a fresh air system and a ventilation- and/or air-conditioning system, comprising:
    a filter body including a folded filter material that laterally surrounds an internal space, except in a lateral region,
    a first end plate and a second end plate, which are sealingly attached to the filter body at sides that are facing away from one another,
    a front plate arranged in the lateral region,
    wherein the front plate includes a first end plate joining region facing the first end plate, the first end plate joining region fused with a front-side end of the first end plate facing the front plate,
    wherein the front plate further includes a second end plate joining region associated with the second end plate, the second end plate joining region fused with a front-side end of the second end plate facing the front plate,
    wherein the front plate further includes a first end fold joining region associated with a first end of the filter body, and at least one first end fold is plasticized into the first end fold joining region, the at least one first end fold disposed at the first end of the filter body,
    wherein the front plate further includes a second end fold joining region associated with a second end of the filter body, and at least one second end fold is plasticized into the second end fold joining region, the at least one second end fold disposed at the second end of the filter body,
    wherein the first end plate joining region is disposed on a first edge region of the front plate and includes a first connecting web projecting from the first edge region, the first connecting web fused axially with the front-side end of the first end plate, and
    wherein the second end plate joining region is disposed on a second edge region of the front plate and includes a second connecting web projecting from the second edge region, the second connecting web fused axially with the front-side end of the second end plate.

2. The filter element according to claim 1, wherein at least one of:
    the first end fold joining region is fused radially with the first end plate in a first edge region facing the first end plate,
    the first end fold joining region is fused radially with the second end plate in a second edge region facing the second end plate,
    the second end fold joining region is fused radially with the first end plate in a first edge region facing the first end plate, and
    the second end fold joining region is fused radially with the second end plate in a second edge region facing the second end plate.

3. The filter element according to claim 2, wherein at least one of the first end fold joining region and the second end fold joining region projects axially over at least one of the first end plate joining region and the second end plate joining region.

4. The filter element according to claim 2, wherein the first end plate and the second end plate have, in a region of the filter body, a distance from one another that is smaller than an opening width of a connecting piece measured parallel to the distance.

5. The filter element according to claim 2, wherein at least one of the first end plate and the second end plate has in an end region facing the front plate a convexity which projects from the internal space outwards from the other of the first end plate and the second end plate.

6. The filter element according to claim 2, wherein at least one of the first end fold and the second end fold has a perforation, which is penetrated by plastic of at least one of the first end fold joining region and the second end fold joining region, respectively.

7. The filter element according to claim 2, wherein at least one of:
    the first edge regions of the first end fold joining region and the first edge region of the second end fold joining region are spaced apart from the first connecting web of the first end plate joining region, and
    the second edge region of the first end fold joining region and the second edge region of the second end fold joining region are spaced apart from the second connecting web of the second end plate joining region.

8. The filter element according to claim 7, wherein at least one of the first end fold and the second end fold has a perforation, which is penetrated by plastic of at least one of the first end fold joining region and the second end fold joining region, respectively.

9. The filter element according to claim 1, wherein at least one of the first end fold joining region and the second end fold joining region project axially over at least one of the first end plate joining region and the second end plate joining region, proceeding from the front plate.

10. The filter element according to claim 1, wherein the first end plate and the second end plate have, in a region of the filter body, a distance from one another which is smaller than an opening width of a connecting piece measured parallel to the distance.

11. The filter element according to claim 1, wherein at least one of the first end plate and the second end plate has in an end region facing the front plate a convexity which projects from the internal space outwards from the other of the first end plate and the second end plate.

12. The filter element according to claim 1, wherein at least one of the first end fold and the second end fold has a perforation, which is penetrated by plastic of at least one of the first end fold joining region and the second end fold joining region, respectively.

13. The filter element according to claim 1, wherein the first end fold joining region is fused radially with the first end plate in a first edge region facing the first end plate.

14. The filter element according to claim 1, wherein the first end fold joining region is fused radially with the second end plate in a second edge region facing the second end plate.

15. The filter element according to claim 1, wherein the second end fold joining region is fused radially with the first end plate in a first edge region facing the first end plate.

16. The filter element according to claim 1, wherein the second end fold joining region is fused radially with the second end plate in a second edge region facing the second end plate.

17. A method for producing a filter element, comprising:
a filter body including a folded filter material that laterally surrounds an internal space, the filter body having a lateral region;
a first end plate and a second end plate, which are sealingly attached to the filter body at sides that are facing away from one another;
a front plate arranged in the lateral region;
the front plate including a first end plate joining region facing the first end plate, the first end plate joining region fused with a front-side end of the first end plate facing the front plate;
wherein the front plate further includes a second end plate joining region associated with the second end plate, the second end plate joining region fused with a front-side end of the second end plate facing the front plate;
wherein the front plate further includes a first end fold joining region associated with a first end of the filter body, and at least one first end fold is plasticized into the first end fold joining region, the at least one first end fold disposed at the first end of the filter body;
wherein the front plate further includes a second end fold joining region associated with a second end of the filter body, and at least one second end fold is plasticized into the second end fold joining region, the at least one second end fold disposed at the second end of the filter body;
wherein the first end plate joining region is disposed on a first edge region of the front plate and includes a first connecting web projecting from the first edge region, the first connecting web fused axially with the front-side end of the first end plate; and
wherein the second end plate joining region is disposed on a second edge region of the front plate and includes a second connecting web projecting from the second edge region, the second connecting web fused axially with the front-side end of the second end plate;
the method comprising the steps of:
securing the first end plate and the second end plate on the filter body,
wherein before arranging the front plate in the lateral region, fusing the front-side ends of the first end plate and the second end plate, the first end plate joining region and the second end plate joining region, and the first end fold joining region and the second end fold joining region, and
arranging the front plate in the lateral region against the front-side ends of the first end plate and the second end plate and against the first end and the second end of the filter body, so that the front-side ends of the first end plate and the second end plate fuse with the first end fold joining region and the second end fold joining region and the first end fold and the second end fold of the filter body plasticize into the first end fold joining region and the second end fold joining region.

18. The method according to claim 17, wherein before fusing, the first end fold joining region and the second end fold joining region have a three-dimensional fusing structure.

19. The method according to claim 17, wherein the first end fold and the second end fold have a perforation, which on placing of the front plate is penetrated by plastic of the first end fold joining region and the second end fold joining region, respectively.

20. The method according to claim 17, wherein on placing of the front plate at least the first end fold and the second end fold are supported via a tool on a rear side, facing away from the front plate.

* * * * *